Patented Oct. 12, 1954

2,691,681

UNITED STATES PATENT OFFICE 2,691,681

STABILIZED ALKOXY AROMATIC AMINES

Adrian L. Linch, Wilmington, Del., assignor to E. I. du Pont de Nemours and Company, Wilmington, Del., a corporation of Delaware No Drawing. Application May 1, 1952,
Serial No. 285,547

19 Claims. (Cl. 260—575)

This invention relates to alkoxy substituted aromatic amines which have been stabilized against atmospheric oxidation, particularly by having incorporated therein small proportions of a new class of anti-oxidants therefor.

It has long been recognized that aromatic amines tend to become rapidly oxidized through contact with air which results in loss of the aromatic amines and decrease in their quality through contamination by the oxidation products. When aromatic amines have acquired a dark color from exposure to air, they are not suitable for the manufacture of azo dyes, pigments, basic colors, vat dyes, pharmaceuticals, rubber chemicals, etc. In practice, such oxidation has been largely avoided by consuming the amines within a few days of their production or the amines have been purified, by distillation or crystallization, just prior to their use. In some cases, the loss of unstabilized amine has been as high as 1% per week and the accumulated oxidation products have adversely affected the yield of substances prepared therefrom, such as azo dyes, by as much as 10%.

In industrial practice, the close scheduling of the production of the amines with the processes in which the amines are consumed has become increasingly less practical. The storage of amines, which deteriorate so that they require purification before use, is prohibitively costly because of the loss of amine by oxidation and the further losses incurred in the purification processes.

Attempts to stabilize aromatic amines, by the use of conventional anti-oxidants employed for stabilizing other substances, have not been commercially successful because such anti-oxidants are inefficient or inoperative. In many cases, such conventional anti-oxidants produce negative results in the aromatic amines; that is, they act as pro-oxygenic catalysts. Also, most metal deactivating agents actually increase the susceptibility of the aromatic amines to attack by atmospheric oxygen.

A. E. Robertson, in Patent No. 2,434,651, proposes to stabilize aromatic amines by adding carbon bisulfide thereto, which carbon bisulfide tends to liberate hydrogen sulfide. While carbon bisulfide and hydrogen sulfide are quite effective anti-oxidants for aromatic amines, they are gases which readily escape from the amines, are obnoxious and toxic and present explosion and corrosion hazards which greatly reduce their utility.

Herbst, in Patent No. 2,422,484, has also proposed the stabilization of certain alkaryl amines with aromatic mercaptans. However, in general, such aromatic mercaptans are not particularly effective in such amines and some of them, after a short period, invert to pro-oxygenic catalysts in such amines. Also, some of such aromatic mercaptans are inoperative with some amines and actually increase the susceptibility of such amines to atmospheric oxidation.

In my copending application, Serial No. 188,871, filed October 6, 1950, now Patent No. 2,655,543, for "Stabilized Aromatic Amines," I have disclosed that certain aromatic amines, other than the alkoxy substituted aromatic amines of the present invention, can be stabilized by a particular class of heterocyclic compounds. While some of the heterocyclic compounds of such prior application are effective to stabilize the alkoxy substituted aromatic amines of the present invention, others are not, some of them actually increasing the susceptibility of the alkoxy substituted aromatic amines to atmospheric oxidation.

It is an object of my invention to provide a certain class of alkoxy substituted aromatic amines containing a class of compounds which are particularly effective to inhibit oxidation of such amines and which do not invert to pro-oxygenic catalysts therein. Another object is to provide a class of alkoxy substituted aromatic amines which are effectively stabilized against atmospheric oxidation, whereby loss of amine by oxidation is prevented, contamination of the amine by oxidation products is reduced and the deleterious effects of the oxidation products in the amine are avoided. A further object is to provide a novel and improved method of stabilizing a specific class of alkoxy substituted aromatic amines. Further objects are to provide new compositions of matter and to advance the art. Still other objects will appear hereinafter.

The above and other objects may be accomplished in accordance with my invention which comprises incorporating in an alkoxy substituted aromatic amine of the formula R–NH$_2$ in which R is a member of the group consisting of mono-substituted phenyl radicals in which the substituent is a alkoxy group of 1 to 2 carbon atoms in one of the positions ortho and para to the NH$_2$ group and disubstituted phenyl radicals in which one substituent is a methoxy group in one of the positions ortho and para to the NH$_2$ group and the other substituent is a methyl group, from about 0.01% to about 0.5% of a member of the group consisting of heterocyclic compounds and their zinc salts in which each heterocyclic compound contains 2 to 10 carbon atoms, 1 to 3 sulfur atoms, at least 2 hydrogen atoms and a single heterocyclic ring composed of 5 to 6 atoms of which 2 to 4 atoms are carbon atoms and 2 to 3 atoms are heterocyclic atoms selected from the group consisting of sulfur and nitrogen atoms, not more than 2 of such heterocyclic atoms being alike, the substituents on all heterocyclic nitrogen atoms being restricted to hydrogen atoms and a single methyl group, and the substituents on the carbon atoms of the heterocyclic ring being restricted to at least one member of the group consisting of hydrogen atoms, saturated hydrocarbon radicals, —SH and =S, there being no more than one saturated hydrocarbon radical or —SH on any single carbon atom of the heterocyclic ring. Thereby, such alkoxy substituted aromatic amines are effectively stabilized against atmospheric oxidation.

I have found that such heterocyclic compounds and their zinc salts are efficient antioxidants for such alkoxy substituted aromatic amines. They effectively inhibit oxidation of such amines and prevent loss of the amine by oxidation, reduce contamination of the amine by oxidation products and avoid the synergistic action of the oxidation products in subsequent chemical processes in which the amines are employed. The resulting stabilized alkoxy substituted aromatic amines may be stored for relatively long periods of time, thereby obviating the necessity for close scheduling of the amine production with the process in which the amine is consumed and usually making costly purification processes unnecessary. Such heterocyclic compounds and their zinc salts are also effective to protect the amines in the processes by which they are manufactured so that higher yields of amine of better quality can be obtained.

The alkoxy aromatic amines, which can be effectively stabilized by the heterocyclic compounds of my invention, are those of the formula R—NH$_2$ in which R represents a monosubstituted phenyl radical in which the substituent is an alkoxy group of 1 to 2 carbon atoms in one of the positions ortho and para to the NH$_2$ group, i. e. ortho-anisidine, para-anisidine, ortho-phenetidine and para-phenetidine; and those of the formula R—NH$_2$ in which R represents a disubstituted phenyl radical in which one substituent is a methoxy group in one of the positions ortho and para to the NH$_2$ group and the other substituent is a methyl group, i. e. the adjacent homologues of ortho-anisidine and para-anisidine, represented by cresidine (2-methoxy-5-methyl aniline).

The heterocyclic compounds of my invention are those which contain 2 to 10 carbon atoms, 1 to 3 sulfur atoms, at least 2 hydrogen atoms and a single heterocyclic ring composed of 5 to 6 atoms of which 2 to 4 atoms are carbon atoms, and 2 to 3 atoms are heterocyclic atoms selected from the group consisting of sulfur and nitrogen atoms, not more than 2 of such heterocyclic atoms being alike, the substituents on any heterocyclic nitrogen atoms being restricted to hydrogen atoms and a single methyl group and the substitutents on the carbon atoms of the heterocyclic ring being restricted to at least one member of the group consisting of hydrogen atoms, saturated hydrocarbon radicals, —SH and =S, there being no more than one saturated hydrocarbon radical or —SH on any single carbon atom of the heterocyclic ring, and their zinc salts. Substituent groups, on the carbon atoms of the heterocyclic ring, which contain unsaturated carbon-carbon bonds, including those in benzene rings, tend to result in compounds which are inoperative in at least some of the alkoxy aromatic amines. Also, organic substituents on the acyclic sulfur atoms tend to result in inoperative compounds. By an "acyclic sulfur atom," I mean one which is outside the ring. Generally, those compounds, which contain one or more acyclic sulfur atoms, may be designated by either of two or more tautomeric formulae, in at least one of which the acyclic sulfur is bonded to both a hydrogen atom and a carbon atom of the heterocyclic ring, and the designation of any such compound by any one of its tautomeric formulae will be understood to mean such compound with any of its assignable formulae.

Preferred classes of heterocyclic compounds comprise those compounds which consist of 2 to 10 carbon atoms, 1 to 2 heterocyclic nitrogen atoms, 2 to 3 sulfur atoms, and at least 2 hydrogen atoms and contain a single heterocyclic ring of 5 to 6 atoms composed of at least 2 carbon atoms, 1 to 2 nitrogen atoms and 1 to 2 sulfur atoms, the substituents on the nitrogen atoms being restricted to hydrogen atoms, each sulfur atom, other than those that are members of the heterocyclic ring, being bonded solely to both a hydrogen atom and a carbon atom which is a member of the heterocyclic ring, and, particularly, those which contain only 1 sulfur atom in the ring and 1 to 2 acyclic sulfur atoms bonded solely to both a hydrogen atom and a carbon atom which is a member of the heterocyclic ring, and the zinc salts thereof.

Other preferred classes of heterocyclic compounds comprise those compounds which consist of 2 to 6 carbon atoms, 1 to 2 heterocyclic nitrogen atoms, 2 to 3 sulfur atoms, and at least 2 hydrogen atoms and contains a single heterocyclic ring of 5 to 6 atoms composed of 2 to 3 carbon atoms, 1 to 2 nitrogen atoms, and 1 to 2 sulfur atoms, the substituents on the nitrogen atoms being restricted to hydrogen atoms, each sulfur atom, other than those that are members of the heterocyclic ring, being bonded solely to both a hydrogen atom and a carbon atom which is a member of the heterocyclic ring, all carbon-carbon bonds in the heterocyclic compound being single bonds, and the zinc salts of such compounds.

Representative heterocyclic compounds of my invention are listed below with their formulae, including the tautomeric formulae:

Thiazoline-2-thiol

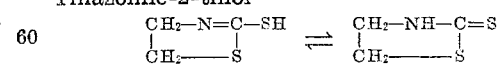

Thiazoline-2-thiol, zinc salt

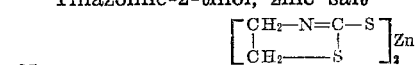

1,3,4-thiadiazole-2,5-dithiol

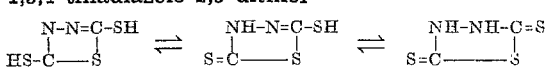

Imidazoline-2-thiol

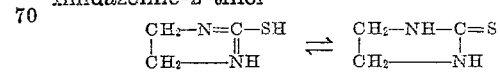

Ethylene trithiocarbonate

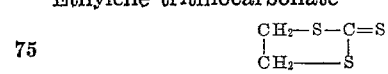

1-methyl-imidazole-2-thiol

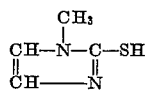

Thialdine

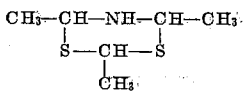

Cyclohexene trithiocarbonate

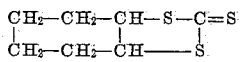

The concentration of the anti-oxidant in the amine should be from about 0.01% to about 0.5% by weight, preferably, from about 0.04% to about 0.2% and usually about 0.1%. While the anti-oxidants of my invention may be effective in concentrations above 0.5%, such higher concentrations will generally be objectionable as they would contaminate the amine to an undesirable extent. Also, concentrations below 0.01% of anti-oxidant will usually show some effect, but such effect will generally be insufficient for practical purposes.

Not all of the heterocyclic compounds (anti-oxidants) of my invention are equally effective for all of the alkoxy aromatic amines of my invention. Accordingly, the particular anti-oxidant and the concentration employed for each of the alkoxy aromatic amines will be chosen in accord with the degree of stability desired. Also, the choice of anti-oxidant and the concentration thereof will be governed by the conditions to which the alkoxy aromatic amine will be exposed, such as light, temperature and atmospheric contact. Light acts as a catalyst for the oxidation of the alkoxy aromatic amines and hence, if the amine is to be exposed to light for any substantial period of time, it will be necessary to materially increase the concentration of the anti-oxidant. Furthermore, the rate of oxidation of the alkoxy aromatic amine increases with increase in temperature, so that the concentration of the anti-oxidant should be increased when the amine is to be subjected to temperatures above atmospheric. Furthermore, the rate of oxidation of the alkoxy aromatic amine varies with variation in the extent of its exposure to air or oxygen and higher concentrations of anti-oxidant will be required when the amine is to be exposed to air to any material extent. Therefore, it will be understood that the anti-oxidants exhibit their maximum efficiency under storage conditions which involve room temperature or lower temperatures, exclude light, and provide a minimum contact with air or oxygen, as in closed metal tanks and drums.

In order to obtain optimum stability of the amine, I generally prefer to add the heterocyclic compound to the alkoxy aromatic amine as soon as the amine is prepared, particularly, immediately after distillation or during crystallization of the amine. If the amine is distilled, minimum contact thereof with oxygen and maximum stabilization are obtained if the amine is distilled into a receiver containing the anti-oxidant. However, the application of my invention is not restricted to freshly prepared amines, as the anti-oxidant may be added to an alkoxy aromatic amine which has been partially oxidized, and the anti-oxidant will effectively retard further oxidation of the amine. Also, the anti-oxidants may be added during the manufacture of the amine to avoid atmospheric oxidation during such manufacture, to thereby obtain the amine in higher yields and better quality. In particular, the anti-oxidant may be added to the crude amine before purification of the amine by crystallization, to thereby inhibit oxidation of the amine during the drying operation.

If the alkoxy aromatic amine is liquid at normal temperatures, the anti-oxidant may be simply added thereto in the desired concentration and dissolved therein. If the amine is a solid at atmospheric temperatures, it may be melted or dissolved in an inert liquid solvent and the anti-oxidant added to the melted amine or to the solution. Also, if the anti-oxidant is not soluble in the alkoxy aromatic amine to the extent desired, it may be added as a solution in a suitable liquid solvent, such as ethanol, isopropyl alcohol and ether. The heterocyclic compounds effectively stabilize the alkoxy aromatic amines in the presence of inert liquid solvents and diluents.

Examples are given hereinafter, illustrating the effect of representative heterocyclic compounds of my invention in stabilizing representative alkoxy aromatic amines, some of such examples including tests with other heterocyclic compounds for purposes of comparison. The tests with liquid alkoxy aromatic amines were carried out in clear glass bottles filled to approximately 75% of their capacity with the amine or stabilized amine and exposed to diffused daylight at room temperature. The bottles were capped but not sealed airtight. In the absence of practical specific analytical methods for direct determination of the concentration of oxidation products in the preliminary stages, the rate of formation of visible color was adopted as the basis for the determination of anti-oxidant activity. The development of color follows an orderly sequence which is related to the extent of oxidation. In nearly every case, the first visible indication of oxidation is produced by derivatives which impart a yellow color to the system, followed by further oxidation to red compounds. Final stages of oxidative decomposition were evidenced by the appearance of green and blue components. Although the oxidation follows a complex series of reactions, and the constitutions of many of the intermediate products are unknown, the autocatalytic nature of the system can be easily demonstrated.

Evaluation of anti-oxidants, which are effective inhibitors for atmospheric oxidation of aromatic amines, has disclosed a certain amount of specificity in the chain of reactions. Whereas, certain inhibitors suppress the initial oxidation to yellow derivatives, the oxidation rate of these yellow components, which do form, to the red stage is only slightly reduced. Other inhibitors are only partially effective in suppressing the production of the initial yellow derivatives, but effectively prevent oxidation to red products. Similar results have been observed in the red to blue-green development stages. Therefore, in order to establish a common basis for quantitative evaluation of anti-oxidant efficiency, the rate of formation of each of these three color classes, as well as total visible color formation, was evaluated as optical density determined in a Cenco-Sheard-Sanford Photelometer, using blue (Central Maximum=410 millimicrons), green (525 millimicrons) and red (610 millimicrons) filters and no filter. Distilled water was used as the reference standard, and the density expressed as per cent transmission. Experience has shown that the use of aromatic amines, darker than a red-amber color, do not produce satisfactory results in chemical processes. Therefore, when oxidation has progressed to an extent sufficient to reduce the total transmission below 75%, blue transmission below 20%, green below 60% and red below 95%, the amine is considered to be unsuitable for use without purification. The sum of the number of days required to reach each of these four values is designated as the index. The anti-oxidant index is obtained by subtracting the index of the unstabilized control sample from the index of the stabilized material. This method minimizes the small variations in oxidation susceptibility exhibited by individual production lots of most amines.

Evaluation of those amines, which are normally solid at room temperature, was carried out somewhat differently. The antioxidant was dissolved in the amine at a temperature sufficiently high to maintain a liquid state. The test was then conducted at that temperature, or the solution was permitted to freeze and the test continued at normal temperature. Since light density measurements were not practical, the progress of the oxidation was estimated visually. The amine was considered unsuitable for use when the color change had progressed to a dark red, dark brown, or dark lavender shade. Since a control sample, containing no anti-oxidant, was tested at the same time, personal variations in judgment of color depth largely cancelled out. In order to place these evaluations on the same index basis adopted for liquid amines, the number of days elapsed to the end point was multiplied by four. In several cases, the crystallizing point was used as the criterion of anti-oxidant efficiency.

In order to further show the effectiveness of the anti-oxidants of my invention, the ratio of the stability of the stabilized amine to the stability of the unstabilized amine may be calculated by dividing the index of the stabilized amine by the index of the unstabilized amine (control index). This ratio is the "stability ratio." This stability ratio expresses the relation of the storage life of the stabilized amine to the storage life of the unstabilized amine under the same conditions. For example, a stability ratio of 2 indicates that the stabilized amine requires twice as long as the unstabilized amine to reach the final stage of oxidative decomposition where it is considered to be unsuitable for most uses; that is, the stabilized amine has a storage life 2 times that of the unstabilized amine.

EXAMPLE 1

Ortho-anisidine

Colorless samples of ortho-anisidine, which had a crystallizing point above 4° C., were obtained by distillation under reduced pressure (10 mm. of mercury) at 101°–104° C. Inhibitors were added in the indicated concentrations to 50 cc. aliquots which were then stored at room temperature in clear glass, lightly capped bottles exposed to diffused daylight. Color changes were observed periodically. The results, expressed as antioxidant index, are summarized in the following table:

| Inhibitor | Control Index | Wt. Percent | Antioxidant Index |
|---|---|---|---|
| Ethylene trithiocarbonate | 44 | 0.1 | 64 |
| Thiazoline-2-thiol | 52 | 0.1 | 54 |
| Thiazoline-2-thiol, zinc salt | 52 | 0.1 | 30 |
| Thialdine | 30 | 0.1 | 56 |
| Imidazoline-2-thiol | 30 | 0.1 | 40 |
| 1-Methyl-imidazole-2-thiol | 44 | 0.1 | 76 |
| 1,3,4-Thiadiazole-2,5-dithiol | 30 | 0.1 | 80 |

EXAMPLE 2

Para-anisidine

Crude para-anisidine, obtained from the hydrogenation of para-nitro-anisole, was distilled at 3–4 mm. mercury pressure at 103°–104° C. to obtain a pale yellow refined product which crystallized at 56.2° C. Evaluation of the oxidation inhibitors were made in 50 cc. aliquots into which the inhibitors were incorporated in the indicated amounts, expressed as per cent by weight, at 70°–75° C. The samples were then stored at 70°±2° C. in clear glass open mouth bottles and the color changes observed periodically. The control index for the unstabilized amine was 4. The following results were obtained:

| Inhibitors | Wt. Percent | Antioxidant Index |
|---|---|---|
| Cyclohexene trithiocarbonate | 0.1 | 4 |
| Thiazoline-2-thiol, zinc salt | 0.1 | 8 |
| Thialdine | 0.1 | 12 |
| Imidazoline-2-thiol | 0.1 | 4 |
| 1,3,4-Thiadiazole-2,5-dithiol | 0.1 | 4 |

EXAMPLE 3

Cresidine

Cresidine (2-methoxy-5-methyl-aniline) was distilled under reduced pressure (8 mm. of mercury) at 113°–114° C. to obtain a nearly colorless product for antioxidant evaluation. The inhibitors were added in the quantities required to produce the indicated concentrations at 70°–75° C. and stirred until dissolved. The aliquots were stored at 70°±2° C. exposed to atmospheric oxygen in clear glass open mouth bottles. The control index was 8. The following results were observed:

| Inhibitors | Wt. Percent | Antioxidant Index |
|---|---|---|
| Thialdine | 0.1 | 20 |
| 1,3,4-Thiadiazole-2,5-dithiol | 0.1 | 36 |

The protective action of thialdine is further illustrated by an evaluation of final purity after 10 days at 68°–70° C., from a comparison of the crystallizing points of the untreated control and of the stabilized sample:

Degrees centigrade
Control _____ 50.7
Thialdine (0.1%) treated aliquot _____ 51.3

The difference in crystallizing points indicates the presence of significant quantities of oxidation products in the unprotected amine.

EXAMPLE 4

Ortho-phenetidine

A sample of commercial ortho-phenetidine was redistilled under reduced pressure (10 mm. of mercury) at 104° C. to obtain a colorless product for antioxidant evaluations. Inhibitors were added, in quantities sufficient to produce a 0.1% by weight concentration, to 50 cc. aliquots which were then stored at room temperature in clear glass bottles. Color changes were followed. The control index was 16.

| Inhibitors | Antioxidant Index |
|---|---|
| 1-Methyl-imidazole-2-thiol | 8 |
| 1,3,4-Thiadiazole-2,5-dithiol | 60 |

EXAMPLE 5
*Para-phenetidine*

Samples of commercial para-phenetidine, which contained less than 2% of impurities or amines other than para-phenetidine, were distilled under reduced pressure (15 mm. of mercury) at 125° C. to obtain a nearly colorless product for evaluation of oxidation inhibitors. Antioxidants were incorporated, in the indicated amounts, to 50 cc. aliquots which were then stored at room temperature, and the color development followed. The results are summarized in tabular form. The control index was 20.

| Inhibitor | Wt. Percent | Antioxidant Index |
|---|---|---|
| Ethylene trithiocarbonate | 0.1 | 72 |
| Cyclohexene trithiocarbonate | 0.1 | 28 |
| Thiazoline-2-thiol, zinc salt | 0.1 | 20 |
| Thialdine | 0.1 | 108 |

For purposes of comparison, 5,5-dimethyl-2-thiazoline-2-thiol, zinc salt was tested in orthophenetidine and in para-phenetidine in a concentration of 0.1% as in Examples 4 and 5, resulting in a negative antioxidant index in each case. Likewise, negative antioxidant indexes resulted when each of tetrahydro-4,4,6-trimethyl-2(1)-pyrimidinethione and 5,5-dimethyl-2,4-dithiohydantoin were tested in cresidine in a concentration of 0.1% as in Example 3. Thus, such heterocyclic compounds, containing 2 hydrocarbon radicals on a single carbon atom of the heterocyclic ring, are inoperative with the alkoxy substituted aromatic amines of the present invention. On the other hand, such heterocyclic compounds are quite effective to stabilize other aromatic amines as disclosed in my prior copending application Serial No. 188,871 hereinbefore referred to.

It will be understood that the preceding examples are given solely for illustrative purposes and that I do not intend to limit my invention to the specific embodiments disclosed therein. It will be apparent to those skilled in the art that other alkoxy substituted aromatic amines, within the class heretofore disclosed, may be similarly stabilized. It will also be apparent that other heterocyclic compounds and their zinc salts, within the class hereinbefore defined, and mixtures of any two or more thereof may be substituted for those of the examples. It will be further apparent that the concentration of the antioxidant in the alkoxy aromatic amine may also be varied within the limits disclosed. Still further, the stabilized amine may be diluted with inert liquid solvents.

It will be apparent that, by my invention, I am able to provide a class of alkoxy substituted aromatic amines which are effectively stabilized against oxidation for relatively long periods of time. Thereby, the amines may be stored without material loss in amine or contamination of the amine with deleterious oxidation products and it is unnecessary to schedule the production of the alkoxy aromatic amines so that they are consumed as rapidly as they are produced. Also, the losses, entailed in purification of oxidized amine, are eliminated or greatly reduced. Accordingly, it is apparent that my invention constitutes a valuable advance in and contribution to the art.

I claim:

1. A composition consisting essentially of an aromatic amine of the formula R—$NH_2$ in which R is a member of the group consisting of monosubstituted phenyl radicals in which the substituent is an alkoxy group of 1 to 2 carbon atoms in one of the positions ortho and para to the $NH_2$ group and disubstituted phenyl radicals in which one substituent is a methoxy group in one of the positions ortho and para to the $NH_2$ group and the other substituent is a methyl group, and from about 0.01% to about 0.5% of a member of the group consisting of heterocyclic compounds and their zinc salts in which each heterocyclic compound contains 2 to 10 carbon atoms, 1 to 3 sulfur atoms, at least 2 hydrogen atoms and a single heterocyclic ring composed of 5 to 6 atoms of which 2 to 4 atoms are carbon atoms and 2 to 3 atoms are heterocyclic atoms selected from the group consisting of sulfur and nitrogen atoms, not more than 2 of such heterocyclic atoms being alike, the substituents on all heterocyclic nitrogen atoms being restricted to hydrogen atoms and a single methyl group, and the substituents on each carbon atom of the heterocyclic ring being restricted to at least one member of the group consisting of hydrogen atoms, saturated hydrocarbon radicals, —SH and =S, there being no more than one saturated hydrocarbon radical or —SH on any single carbon atom of the heterocyclic ring.

2. A composition consisting essentially of an aromatic amine of the formula R—$NH_2$ in which R is a member of the group consisting of monosubstituted phenyl radicals in which the substituent is an alkoxy group of 1 to 2 carbon atoms in one of the positions ortho and para to the $NH_2$ group and disubstituted phenyl radicals in which one substituent is a methoxy group in one of the positions ortho and para to the $NH_2$ group and the other substituent is a methyl group, and from about 0.01% to about 0.5% of a heterocyclic compound which contains 2 to 10 carbon atoms, 1 to 3 sulfur atoms, at least 2 hydrogen atoms and a single heterocyclic ring composed of 5 to 6 atoms of which 2 to 4 atoms are carbon atoms and 2 to 3 atoms are heterocyclic atoms selected from the group consisting of sulfur and nitrogen atoms, not more than 2 of such heterocyclic atoms being alike, the substituents on all heterocyclic nitrogen atoms being restricted to hydrogen atoms and a single methyl group, and the substituents on the carbon atoms of the heterocyclic ring being restricted to at least one member of the group consisting of hydrogen atoms, saturated hydrocarbon radicals, —SH and =S, there being no more than one saturated hydrocarbon radical or —SH on any single carbon atom of the heterocyclic ring.

3. A composition consisting essentially of an aromatic amine of the formula R—$NH_2$ in which R is a member of the group consisting of monosubstituted phenyl radicals in which the substituent is an alkoxy group of 1 to 2 carbon atoms in one of the positions ortho and para to the $NH_2$ group and disubstituted phenyl radicals in which one substituent is a methoxy group in one of the positions ortho and para to the NH₂ group and the other substituent is a methyl group, and from about 0.01% to about 0.5% of a heterocyclic compound which consists of 2 to 10 carbon atoms, 1 to 2 heterocyclic nitrogen atoms, 2 to 3 sulfur atoms, and at least 2 hydrogen atoms and contains a single heterocyclic ring of 5 to 6 atoms composed of at least 2 carbon atoms, 1 to 2 nitrogen atoms and 1 to 2 sulfur atoms, the substituents on the nitrogen atoms being restricted to hydrogen atoms, each sulfur atom, other than those that are members of the heterocyclic ring, being bonded solely to both a hydrogen atom and a carbon atom which is a member of the heterocyclic ring, there being no more than one saturated hydrocarbon radical or —SH on any single carbon atom of the heterocyclic ring.

4. A composition consisting essentially of an aromatic amine of the formula R—NH₂ in which R is a member of the group consisting of monosubstituted phenyl radicals in which the substituent is an alkoxy group of 1 to 2 carbon atoms in one of the positions ortho and para to the NH₂ group and disubstituted phenyl radicals in which one substituent is a methoxy group in one of the positions ortho and para to the NH₂ group and the other substituent is a methyl group, and from about 0.01% to about 0.5% of a heterocyclic compound which consists of 2 to 6 carbon atoms, 1 to 2 heterocyclic nitrogen atoms, 2 to 3 sulfur atoms, and at least 2 hydrogen atoms and contains a single heterocyclic ring of 5 to 6 atoms composed of 2 to 3 carbon atoms, and 1 to 2 nitrogen atoms and 1 to 2 sulfur atoms, the substituents on the nitrogen atoms being restricted to hydrogen atoms, each sulfur atom, other than those that are members of the heterocyclic ring, being bonded solely to both a hydrogen atom and a carbon atom which is a member of the heterocyclic ring, there being no more than one saturated hydrocarbon radical or —SH on any single carbon atom of the heterocyclic ring, and all carbon-carbon bonds in the heterocyclic compound being single bonds.

5. A composition consisting essentially of an aromatic amine of the formula R—NH₂ in which R is a member of the group consisting of monosubstituted phenyl radicals in which the substituent is an alkoxy group of 1 to 2 carbon atoms in one of the positions ortho and para to the NH₂ group and disubstituted phenyl radicals in which one substituent is a methoxy group in one of the positions ortho and para to the NH₂ group and the other substituent is a methyl group, and from about 0.01% to about 0.5% of a heterocyclic compound which consists of 2 to 10 carbon atoms, 1 to 2 heterocyclic nitrogen atoms, 2 to 3 sulfur atoms, and at least 2 hydrogen atoms and contains a single heterocyclic ring of 5 to 6 atoms composed of at least 2 carbon atoms, 1 to 2 nitrogen atoms and 1 sulfur atom, the substituents on the nitrogen atoms being restricted to hydrogen atoms, and 1 to 2 of the sulfur atoms being acyclic sulfur atoms bonded solely to both a hydrogen atom and a carbon atom which is a member of the heterocyclic ring, there being no more than one saturated hydrocarbon radical or —SH on any single carbon atom of the heterocyclic ring.

6. A composition consisting essentially of an aromatic amine of the formula R—NH₂ in which R is a member of the group consisting of monosubstituted phenyl radicals in which the substituent is an alkoxy group of 1 to 2 carbon atoms in one of the positions ortho and para to the NH₂ group and disubstituted phenyl radicals in which one substituent is a methoxy group in one of the positions ortho and para to the NH₂ group and the other substituent is a methyl group, and from about 0.01% to about 0.5% of a heterocyclic compound which consists of 2 to 3 carbon atoms, 1 to 2 heterocyclic nitrogen atoms, 1 heterocyclic sulfur atom, 1 to 2 acyclic sulfur atoms and at least 2 hydrogen atoms and contains a single heterocyclic ring of 5 atoms composed of 2 to 3 carbon atoms, the 1 to 2 heterocyclic nitrogen atoms and the 1 heterocyclic sulfur atom, the 1 to 2 acyclic sulfur atoms being bonded solely to both a hydrogen atom and a carbon atom which is a member of the heterocyclic ring, there being no more than one —SH on any single carbon atom of the heterocyclic ring, and all carbon-carbon bonds in the heterocyclic compound being single bonds.

7. A composition consisting essentially of an aromatic amine of the formula R—NH₂ in which R is a member of the group consisting of monosubstituted phenyl radicals in which the substituent is an alkoxy group of 1 to 2 carbon atoms in one of the positions ortho and para to the NH₂ group and disubstituted phenyl radicals in which one substituent is a methoxy group in one of the positions ortho and para to the NH₂ group and the other substituent is a methyl group, and from about 0.01% to about 0.5% of 1,3,4-thiadiazole-2,5-dithiol.

8. A composition consisting essentially of an aromatic amine of the formula R—NH₂ in which R is a member of the group consisting of monosubstituted phenyl radicals in which the substituent is an alkoxy group of 1 to 2 carbon atoms in one of the positions ortho and para to the NH₂ group and disubstituted phenyl radicals in which one substituent is a methoxy group in one of the positions ortho and para to the NH₂ group and the other substituent is a methyl group, and from about 0.01% to about 0.5% of thiazoline-2-thiol.

9. A composition consisting essentially of an aromatic amine of the formula R—NH₂ in which R is a mono-alkoxy substituted phenyl radical in which the alkoxy group contains 1 to 2 carbon atoms and is in one of the positions ortho and para to the NH₂ group, and from about 0.01% to about 0.5% of a member of the group consisting of heterocyclic compounds and their zinc salts in which each heterocyclic compound contains 2 to 10 carbon atoms, 1 to 3 sulfur atoms, at least 2 hydrogen atoms and a single heterocyclic ring composed of 5 to 6 atoms of which 2 to 4 atoms are carbon atoms and 2 to 3 atoms are heterocyclic atoms selected from the group consisting of sulfur and nitrogen atoms, not more than 2 of such heterocyclic atoms being alike, the substituents on all heterocyclic nitrogen atoms being restricted to hydrogen atoms and a single methyl group, and the substituents on each carbon atom of the heterocyclic ring being restricted to at least one member of the group consisting of hydrogen atoms, saturated hydrocarbon radicals, —SH and =S, there being no more than one saturated hydrocarbon radical or —SH on any single carbon atom of the heterocyclic ring.

10. A composition consisting essentially of an aromatic amine of the formula R—NH₂ in which R is a mono-alkoxy substituted phenyl radical in which the alkoxy group contains 1 to 2 carbon atoms and is in one of the positions ortho and para to the NH₂ group, and from about 0.01% to about 0.5% of a heterocyclic compound which contains 2 to 10 carbon atoms, 1 to 3 sulfur atoms, at least 2 hydrogen atoms and a single heterocyclic ring composed of 5 to 6 atoms of which 2 to 4 atoms are carbon atoms and 2 to 3 atoms are heterocyclic atoms selected from the group consisting of sulfur and nitrogen atoms, not more than 2 of such heterocyclic atoms being alike, the substituents on all heterocyclic nitrogen atoms being restricted to hydrogen atoms and a single methyl group, and the substituents on the carbon atoms of the heterocyclic ring being restricted to at least one member of the group consisting of hydrogen atoms, saturated hydrocarbon radicals, —SH and =S, there being no more than one saturated hydrocarbon radical or —SH on any single carbon atom of the heterocyclic ring.

11. A composition consisting essentially of an aromatic amine of the formula R—NH$_2$ in which R is a monoalkoxy substituted phenyl radical in which the alkoxy group contains 1 to 2 carbon atoms and is in one of the positions ortho and para to the NH$_2$ group, and from about 0.01% to about 0.5% of a heterocyclic compound which consists of 2 to 10 carbon atoms, 1 to 2 heterocyclic nitrogen atoms, 2 to 3 sulfur atoms, and at least 2 hydrogen atoms and contains a single heterocyclic ring of 5 to 6 atoms composed of at least 2 carbon atoms, 1 to 2 nitrogen atoms and 1 to 2 sulfur atoms, the substituents on the nitrogen atoms being restricted to hydrogen atoms, each sulfur atom, other than those that are members of the heterocyclic ring, being bonded solely to both a hydrogen atom and a carbon atom which is a member of the heterocyclic ring, there being no more than one saturated hydrocarbon radical or —SH on any single carbon atom of the heterocyclic ring.

12. A composition consisting essentially of an aromatic amine of the formula R—NH$_2$ in which R is a monoalkoxy substituted phenyl radical in which the alkoxy group contains 1 to 2 carbon atoms and is in one of the positions ortho and para to the NH$_2$ group, and from about 0.01% to about 0.5% of a heterocyclic compound which consists of 2 to 3 carbon atoms, 1 to 2 heterocyclic nitrogen atoms, 1 heterocyclic sulfur atom, 1 to 2 acyclic sulfur atoms and at least 2 hydrogen atoms and contains a single heterocyclic ring of 5 atoms composed of 2 to 3 carbon atoms, the 1 to 2 heterocyclic nitrogen atoms and the 1 heterocyclic sulfur atom, the 1 to 2 acyclic sulfur atoms being bonded solely to both a hydrogen atom and a carbon atom which is a member of the heterocyclic ring, there being no more than one —SH on any single carbon atom of the heterocyclic ring, and all carbon-carbon bonds in the heterocyclic compound being single bonds.

13. A composition consisting essentially of ortho-anisidine and from about 0.01% to about 0.5% of thiazoline-2-thiol.

14. A composition consisting essentially of orthoanisidine and from about 0.01% to about 0.5% of 1,3,4-thiadiazole-2,5-dithiol.

15. A composition consisting essentially of an aromatic amine of the formula R—NH$_2$ in which R is a di-substituted phenyl radical in which one substituent is a methoxy group in one of the positions ortho and para to the NH$_2$ group and the other substituent is a methyl group, and from about 0.01% to about 0.5% of a member of the group consisting of heterocyclic compounds and their zinc salts in which each heterocyclic compound contains 2 to 10 carbon atoms, 1 to 3 sulfur atoms, at least 2 hydrogen atoms and a single heterocyclic ring composed of 5 to 6 atoms of which 2 to 4 atoms are carbon atoms and 2 to 3 atoms are heterocyclic atoms selected from the group consisting of sulfur and nitrogen atoms, not more than 2 of such heterocyclic atoms being alike, the substituents on all heterocyclic nitrogen atoms being restricted to hydrogen atoms and a single methyl group, and the substituents on each carbon atom of the heterocyclic ring being restricted to at least one member of the group consisting of hydrogen atoms, saturated hydrocarbon radicals, —SH and =S, there being no more than one saturated hydrocarbon radical or —SH on any single carbon atom of the heterocyclic ring.

16. A composition consisting essentially of an aromatic amine of the formula R—NH$_2$ in which R is a di-substituted phenyl radical in which one substituent is a methoxy group in one of the positions ortho and para to the NH$_2$ group and the other substituent is a methyl group, and from about 0.01% to about 0.5% of a heterocyclic compound which contains 2 to 10 carbon atoms, 1 to 3 sulfur atoms, at least 2 hydrogen atoms and a single heterocyclic ring composed of 5 to 6 atoms of which 2 to 4 atoms are carbon atoms and 2 to 3 atoms are heterocyclic atoms selected from the group consisting of sulfur and nitrogen atoms, not more than 2 of such heterocyclic atoms being alike, the substituents on all heterocyclic nitrogen atoms being restricted to hydrogen atoms and a single methyl group, and the substituents on the carbon atoms of the heterocyclic ring being restricted to at least one member of the group consisting of hydrogen atoms, saturated hydrocarbon radicals, —SH and =S, there being no more than one saturated hydrocarbon radical or —SH on any single carbon atom of of the heterocyclic ring.

17. A composition consisting essentially of an aromatic amine of the formula R—NH$_2$ in which R is a di-substituted phenyl radical in which one substituent is a methoxy group in one of the positions ortho and para to the NH$_2$ group and the other substituent is a methyl group, and from about 0.01% to about 0.5% of a heterocyclic compound which consists of 2 to 10 carbon atoms, 1 to 2 heterocyclic nitrogen atoms, 2 to 3 sulfur atoms, and at least 2 hydrogen atoms and contains a single heterocyclic ring of 5 to 6 atoms composed of at least 2 carbon atoms, 1 to 2 nitrogen atoms and 1 to 2 sulfur atoms, the substituents on the nitrogen atoms being restricted to hydrogen atoms, each sulfur atom, other than those that are members of the heterocyclic ring, being bonded solely to both a hydrogen atom and a carbon atom which is a member of the heterocyclic ring, there being no more than one saturated hydrocarbon radical or —SH on any single carbon atom of the heterocyclic ring.

18. A composition consisting essentially of an aromatic amine of the formula R—NH$_2$ in which R is a di-substituted phenyl radical in which one substituent is a methoxy group in one of the positions ortho and para to the NH$_2$ group and the other substituent is a methyl group, and from about 0.01% to about 0.5% of 1,3,4-thidiazole-2,5-dithiol.

19. A composition consisting essentially of 2-methoxy-5-methyl-aniline and from about 0.01% to about 0.5% of 1,3,4-thiadiazole-2,5-dithiol.

No references cited.